(12) United States Patent
Wang et al.

(10) Patent No.: US 7,593,030 B2
(45) Date of Patent: Sep. 22, 2009

(54) TELE-ROBOTIC VIDEOCONFERENCING IN A CORPORATE ENVIRONMENT

(75) Inventors: Yulun Wang, Goleta, CA (US); Charles S. Jordan, Santa Barbara, CA (US); Jonathan Southard, Santa Barbara, CA (US); Marco Pinter, Santa Barbara, CA (US)

(73) Assignee: InTouch Technologies, Inc., Goleta, CA (US)

( * ) Notice: Subject to any disclaimer, the term of this patent is extended or adjusted under 35 U.S.C. 154(b) by 56 days.

(21) Appl. No.: 10/966,539

(22) Filed: Oct. 15, 2004

(65) Prior Publication Data
US 2006/0082642 A1   Apr. 20, 2006

Related U.S. Application Data

(63) Continuation-in-part of application No. 10/783,760, filed on Feb. 20, 2004, which is a continuation-in-part of application No. 10/206,457, filed on Jul. 25, 2002, now Pat. No. 6,925,357.

(60) Provisional application No. 60/449,762, filed on Feb. 24, 2003.

(51) Int. Cl.
   H04N 7/14   (2006.01)
   G05B 11/01  (2006.01)
(52) U.S. Cl. .............. 348/14.05; 348/14.08; 348/14.01
(58) Field of Classification Search ... 348/14.01–14.09, 348/14.1, 14.11, 14.12, 14.13; 709/203, 709/204; 700/13, 90, 245; 901/14, 19, 46
See application file for complete search history.

(56) References Cited

U.S. PATENT DOCUMENTS

| | | | |
|---|---|---|---|
| 3,821,995 | A | 7/1974 | Aghnides |
| 4,413,693 | A | 11/1983 | Derby |
| 4,471,354 | A | 9/1984 | Smith |
| 4,519,466 | A | 5/1985 | Shiraishi |
| 4,638,445 | A | 1/1987 | Mattaboni |
| 4,709,265 | A | 11/1987 | Silverman et al. |
| 4,733,737 | A | 3/1988 | Falamak |
| 4,803,625 | A | 2/1989 | Fu et al. |
| 4,875,172 | A | 10/1989 | Kanayama |

(Continued)

FOREIGN PATENT DOCUMENTS

CA   2289697 A1   11/1998

(Continued)

OTHER PUBLICATIONS

Baltus et al., "Towards Personal Service Robots for the Elderly", Computer Science and Robotoics.

(Continued)

*Primary Examiner*—Melur Ramakrishnaiah
(74) *Attorney, Agent, or Firm*—Ben J. Yorks; Irell & Manella LLP

(57) ABSTRACT

A business to business mobile teleconferencing system. The system includes a mobile robot that can be remotely operated from a remote station. Both the robot and the remote station may have a camera, a screen, a microphone and a speaker to conduct a teleconference between a user at the remote station and personnel located in viewing proximity of the robot.

14 Claims, 4 Drawing Sheets

U.S. PATENT DOCUMENTS

| | | |
|---|---|---|
| 4,977,971 A | 12/1990 | Crane, III et al. |
| 5,073,749 A | 12/1991 | Kanayama |
| 5,084,828 A | 1/1992 | Kaufman et al. |
| 5,130,794 A | 7/1992 | Ritchey |
| 5,186,270 A | 2/1993 | West |
| 5,341,242 A | 8/1994 | Gilboa et al. |
| 5,341,854 A | 8/1994 | Zezulka et al. |
| 5,374,879 A | 12/1994 | Pin et al. |
| 5,419,008 A | 5/1995 | West |
| 5,441,047 A | 8/1995 | David et al. |
| 5,442,728 A | 8/1995 | Kaufman et al. |
| 5,462,051 A | 10/1995 | Oka et al. |
| 5,486,853 A | 1/1996 | Baxter et al. |
| 5,510,832 A | 4/1996 | Garcia |
| 5,544,649 A | 8/1996 | David et al. |
| 5,553,609 A | 9/1996 | Chen et al. |
| 5,572,229 A | 11/1996 | Fisher |
| 5,630,566 A | 5/1997 | Case |
| 5,636,218 A * | 6/1997 | Ishikawa et al. ............ 370/401 |
| 5,701,904 A | 12/1997 | Simmons et al. |
| 5,762,458 A | 6/1998 | Wang et al. |
| 5,786,846 A | 7/1998 | Hiroaki |
| 5,802,494 A | 9/1998 | Kuno |
| 5,836,872 A | 11/1998 | Kenet et al. |
| 5,838,575 A | 11/1998 | Lion |
| 5,857,534 A | 1/1999 | DeValult et al. |
| 5,867,653 A | 2/1999 | Aras et al. |
| 5,917,958 A | 6/1999 | Nunally et al. |
| 5,927,423 A | 7/1999 | Wada et al. |
| 5,959,423 A | 9/1999 | Nakanishi et al. |
| 5,966,130 A | 10/1999 | Benman, Jr. |
| 6,006,946 A | 12/1999 | Williams et al. |
| 6,036,812 A | 3/2000 | Williams et al. |
| 6,133,944 A | 10/2000 | Braun et al. |
| 6,135,228 A | 10/2000 | Asada et al. |
| 6,170,929 B1 | 1/2001 | Wilson et al. |
| 6,211,903 B1 | 4/2001 | Bullister |
| 6,219,587 B1 | 4/2001 | Ahlin et al. |
| 6,232,735 B1 | 5/2001 | Baba et al. |
| 6,233,504 B1 | 5/2001 | Das et al. |
| 6,233,735 B1 | 5/2001 | Ebihara |
| 6,256,556 B1 | 7/2001 | Zenke |
| 6,259,806 B1 | 7/2001 | Green |
| 6,289,263 B1 | 9/2001 | Mukherjee |
| 6,292,713 B1 | 9/2001 | Jouppi et al. |
| 6,304,050 B1 | 10/2001 | Skaar et al. |
| 6,321,137 B1 | 11/2001 | De Smet |
| 6,325,756 B1 | 12/2001 | Webb et al. |
| 6,330,493 B1 | 12/2001 | Takahashi et al. |
| 6,346,950 B1 | 2/2002 | Jouppi |
| 6,369,847 B1 | 4/2002 | James et al. |
| 6,430,471 B1 | 8/2002 | Kintou et al. |
| 6,430,475 B2 | 8/2002 | Okamoto et al. |
| 6,438,457 B1 | 8/2002 | Yokoo et al. |
| 6,463,361 B1 | 10/2002 | Wang et al. |
| 6,466,844 B1 | 10/2002 | Ikeda et al. |
| 6,474,434 B1 | 11/2002 | Bech |
| 6,491,701 B2 | 12/2002 | Tierney et al. |
| 6,496,099 B2 | 12/2002 | Wang et al. |
| 6,507,773 B2 | 1/2003 | Parker et al. |
| 6,522,906 B1 | 2/2003 | Salisbury et al. |
| 6,532,404 B2 | 3/2003 | Colens |
| 6,535,182 B2 | 3/2003 | Stanton |
| 6,535,793 B2 | 3/2003 | Allard |
| 6,540,039 B1 | 4/2003 | Yu et al. |
| 6,543,899 B2 | 4/2003 | Covannon et al. |
| 6,549,215 B2 | 4/2003 | Jouppi |
| 6,587,750 B2 | 7/2003 | Gerbi et al. |
| 6,594,552 B1 | 7/2003 | Nowlin et al. |
| 6,604,019 B2 | 8/2003 | Ahlin et al. |
| 6,604,021 B2 | 8/2003 | Imai et al. |
| 6,646,677 B2 | 11/2003 | Noro et al. |
| 6,684,129 B2 | 1/2004 | Salisbury et al. |
| 6,691,000 B2 | 2/2004 | Nagai et al. |
| 6,710,797 B1 | 3/2004 | McNelley et al. |
| 6,728,599 B2 | 4/2004 | Wang et al. |
| 6,781,606 B2 | 8/2004 | Jouppi |
| 6,784,916 B2 | 8/2004 | Smith |
| 6,785,589 B2 | 8/2004 | Eggenberger et al. |
| 6,799,065 B1 | 9/2004 | Niemeyer |
| 6,799,088 B2 | 9/2004 | Wang et al. |
| 6,804,656 B1 | 10/2004 | Rosenfeld et al. |
| 6,836,703 B2 | 12/2004 | Wang et al. |
| 6,839,612 B2 | 1/2005 | Sanchez et al. |
| 6,840,904 B2 | 1/2005 | Goldberg |
| 6,845,297 B2 | 1/2005 | Allard |
| 6,852,107 B2 | 2/2005 | Wang et al. |
| 6,871,117 B2 | 3/2005 | Wang et al. |
| 6,879,879 B2 | 4/2005 | Jouppi et al. |
| 6,892,112 B2 | 5/2005 | Wang et al. |
| 6,895,305 B2 | 5/2005 | Lathan et al. |
| 6,914,622 B1 | 7/2005 | Smith et al. |
| 6,925,357 B2 | 8/2005 | Wang et al. |
| 6,995,664 B1 | 2/2006 | Darling |
| 7,115,102 B2 | 10/2006 | Abbruscato |
| 7,129,970 B2 | 10/2006 | James et al. |
| 7,142,945 B2 | 11/2006 | Wang et al. |
| 7,142,947 B2 | 11/2006 | Wang et al. |
| 7,151,982 B2 | 12/2006 | Liff et al. |
| 7,154,526 B2 | 12/2006 | Foote et al. |
| 7,155,306 B2 | 12/2006 | Haitin et al. |
| 7,158,859 B2 | 1/2007 | Wang et al. |
| 7,158,860 B2 | 1/2007 | Wang et al. |
| 7,161,322 B2 | 1/2007 | Wang et al. |
| 7,164,969 B2 | 1/2007 | Wang et al. |
| 7,174,238 B1 | 2/2007 | Zweig |
| 7,184,559 B2 | 2/2007 | Jouppi |
| 7,256,708 B2 | 8/2007 | Rosenfeld |
| 7,262,573 B2 | 8/2007 | Wang et al. |
| 2001/0010053 A1 | 7/2001 | Ben-Shachar et al. |
| 2001/0037163 A1 | 11/2001 | Allard |
| 2001/0054071 A1 | 12/2001 | Loeb |
| 2002/0027597 A1 | 3/2002 | Sachau |
| 2002/0057279 A1 | 5/2002 | Jouppi |
| 2002/0058929 A1 | 5/2002 | Green |
| 2002/0063726 A1 | 5/2002 | Jouppi |
| 2002/0104094 A1 | 8/2002 | Alexander et al. |
| 2002/0120362 A1 | 8/2002 | Lathan et al. |
| 2002/0130950 A1 | 9/2002 | James et al. |
| 2002/0141595 A1 | 10/2002 | Jouppi |
| 2002/0143923 A1 | 10/2002 | Alexander |
| 2002/0177925 A1 | 11/2002 | Onishi et al. |
| 2002/0183894 A1 | 12/2002 | Wang et al. |
| 2003/0048481 A1* | 3/2003 | Kobayashi et al. .......... 358/302 |
| 2003/0050733 A1 | 3/2003 | Wang et al. |
| 2003/0060808 A1 | 3/2003 | Wilk |
| 2003/0100892 A1 | 5/2003 | Morley et al. |
| 2003/0114962 A1 | 6/2003 | Niemeyer |
| 2003/0135203 A1 | 7/2003 | Wang et al. |
| 2003/0144579 A1 | 7/2003 | Buss |
| 2003/0144649 A1 | 7/2003 | Ghodoussi et al. |
| 2003/0151658 A1 | 8/2003 | Smith |
| 2003/0220541 A1 | 11/2003 | Salisbury et al. |
| 2004/0019406 A1* | 1/2004 | Wang et al. ................. 700/231 |
| 2004/0068657 A1 | 4/2004 | Alexander et al. |
| 2004/0088077 A1* | 5/2004 | Jouppi et al. ................ 700/245 |
| 2004/0093409 A1 | 5/2004 | Thompson et al. |
| 2004/0117065 A1 | 6/2004 | Wang et al. |
| 2004/0138547 A1 | 7/2004 | Wang et al. |
| 2004/0143421 A1 | 7/2004 | Wang et al. |
| 2004/0162637 A1 | 8/2004 | Wang et al. |
| 2004/0167666 A1 | 8/2004 | Wang et al. |
| 2004/0167668 A1 | 8/2004 | Wang et al. |
| 2004/0174129 A1 | 9/2004 | Wang et al. |

| | | | |
|---|---|---|---|
| 2004/0215490 A1 | 10/2004 | Duchon et al. | |
| 2005/0021182 A1 | 1/2005 | Wang et al. | |
| 2005/0021183 A1 | 1/2005 | Wang et al. | |
| 2005/0021187 A1 | 1/2005 | Wang et al. | |
| 2005/0021309 A1 | 1/2005 | Alexander et al. | |
| 2005/0024485 A1* | 2/2005 | Castles et al. | 348/14.03 |
| 2005/0027794 A1 | 2/2005 | Decker | |
| 2005/0028221 A1* | 2/2005 | Liu et al. | 725/133 |
| 2005/0035862 A1 | 2/2005 | Wildman et al. | |
| 2005/0038416 A1 | 2/2005 | Wang et al. | |
| 2005/0038564 A1 | 2/2005 | Burick et al. | |
| 2005/0052527 A1* | 3/2005 | Remy et al. | 348/14.08 |
| 2005/0065438 A1 | 3/2005 | Miller | |
| 2005/0065659 A1 | 3/2005 | Tanaka et al. | |
| 2005/0110867 A1* | 5/2005 | Schulz | 348/14.05 |
| 2005/0204438 A1 | 9/2005 | Wang et al. | |
| 2006/0082642 A1 | 4/2006 | Wang et al. | |

FOREIGN PATENT DOCUMENTS

| | | | |
|---|---|---|---|
| EP | 0981905 B1 | | 1/2002 |
| JP | 2007-213753 A | | 8/1995 |
| JP | 2007-248823 A | | 8/1995 |
| JP | 07257422 A | | 10/1995 |
| JP | 08-084328 | * | 3/1996 |
| JP | 08-084328 A | | 3/1996 |
| JP | 2000-032319 A | | 1/2000 |
| JP | 2001 198868 A | | 7/2001 |
| JP | 2002-046088 | * | 2/2002 |
| JP | 2002305743 A | * | 10/2002 |
| JP | 2002305743 A | | 10/2002 |
| JP | 2002-355779 A | | 12/2002 |
| WO | WO 98/51078 A | | 11/1998 |

OTHER PUBLICATIONS

Bauer, Jeffrey C., "Service Robots in Health Care: The Evolution of Mechanical Solutions to Human Resource Problems", Jun. 2003.
Breslow, Michael J., MD et al., "Effect of a multiple-site intensive care unit telemedicine program on clinical and economic outcome: An alternative paradigm for intensivist staffing", Critical Care Med, Jan. 2004, vol. 32, No. 1, pp. 31-38.
Celi et al., "The eICU: It's not just telemedicine", Critical Care Medicine, vol. 29, No. 8 (Supplement), Aug. 2001.
CNN.com/Technology, Paging R.Robot: Machine helps doctors with patients, Sep. 30, 2003, Internet, 1-3.
Davies, "Robotics in Minimally Invasive Surgery", 1995, Internet, pp. 5/1-5/2.
Ellison et al., "Telerounding and Patient Satisfaction Following Surgery".
Goldman, Lea, "Machine Dreams", Entrepreneurs, Forbes, May 27, 2002.
Harmo et al., "Moving Eye—Interactive Telepresence Over Internet With a Ball Shaped Mobile Robot", 2000.
Hees, William P., "Communications Design for a Remote Presence Robot", Jan. 14, 2002.
Jouppi, et al., :Mutually-Immersive Audio Telepresence, Audio Engineering Society Convention Paper, presented at 113th Convention Oct. 2002.
Jouppi, Norman P., "First Steps Towards Mutually-Immersive Mobile Telepresence", CSCW '02, Nov. 16-20, 2002, New Orleans LA.
Kanehiro, Fumio et al., Virtual Humanoid Robot Platform to Develop Controllers of Real Humanoid Robots without Porting, 2001,IEEE, pp. 3217-3276.
Kaplan et al., "An Internet Accessible Telepresence".
Kuzuoka et al., "Can The GestureCam Be A Surrogate?".
Lim, Hun-ok et al., Control to Realize Human-like Walking of a Biped Humanoid Robot, IEE 2000, pp. 3271-3276.
Loeb, Gerald, "Virtual Visit: Improving Communication for Those Who Need it Most", 2001.
Mack, "Minimally invasive and robotic surgery", 2001, IEEE, pp. 568-572.

Magne Charge—Smart Power for Electric Vehicles, Internet, Jun. 27, 2002.
Martin, Anya, "Days Ahead", Assisted Living Today, vol. 9, Nov./Dec. 2002, pp. 19-22.
McCardle et al., "The challenge of utilizing new technology in design education", 2000 Internet, pp. 122-127.
Ojha, Anad, "An application of Virtual Reality in Rehabilitation", Jan. 1994, IEEE, pp. 4-6.
Paulos et al., "A World Wide Web Telerobotic Remote Environment Browser", http://vive.cs.berkeley.edu/capek, 1995.
Paulos, Eric John, "Personal Tele-Embodiment", 2001.
Paulos, et al., "Ubiquitous Tele-embodiment: Applications and Implications", International Journal of Human Computer Studies, Jun. 1997, vol. 46, No. 6, pp. 861-877.
Paulos, et al., "Designing Personal Tele-Embodiment", Presented at the IEEE International Conference on Robotics and Animation, Leuven, Belgium, May 20, 1998.
Pin et al., "A New Family of Omnidirectional and Holonomic Wheeled Platforms for Mobile Robots", IEEE, vol. 10, No. 4, Aug. 1994.
Robot Hardware Mobile Robotics Research Group, Edinburgh, "Mobile Robotics Research Group", 2000 Internet, pp. 1-2.
Roland Piquepaille's Technology Trends, "How new technologies are modifying your way of life", 2003, Internet, pp. 1-2.
PYXIS HelpMate®, the Trackless Robotic Courier, Internet, 3 pgs. "Remote Presence", p. 131-147.
Roy et al., "Towards Personal Service Robots for the Elderly", Internet, Mar. 7, 2002.
Stephenson, Gary, "Dr. Robot Tested at Hopkins", 2003, Internet, p. 1.
Stoianovici et al., "Robotic Tools for Minimally Invasive Urologic Surgery", Dec. 2002, Internet, 1-17.
Tendick et al., "Human-Machine Interfaces for Minimally Invasive Surgery", 1997, IEEE, pp. 1-6.
Thrun et al, "Probabilistic Algorithms and the Interactive Museum Tour-Guide Robot Minerva", 2000, Internet pp. 1-35.
Tzafestas, et al., "VR-based Teleoperation of a Mobile Robotic Assistant: Progress Report", 2000, Internet, pp. 1-23.
Urquhart, Kim, "InTouch's robotic Companion 'beams up' healthcare experts", Medical Device Daily, vol. 7, No. 39, Feb. 27, 2003, p. 1, 4.
Zorn, Benjamin G., "Ubiquitous Telepresence", http://www.cs.colorado.edu/~zom/ut/vision/vision.html, Mar. 5, 1996.
Baltus et al., "Towards Personal Service Robots for the Elderly", Computer Science and Robotoics No date is available; Mrk.
Ellison et al., "Telerounding and Patient Satisfaction Following Surgery" No date is available; Mrk.
Kaplan et al., "An Internet Accessible Telepresence" No date is available; Mrk.
Kuzuoka et al., "Can The GestureCam Be A Surrogate?" No date is available; Mrk.
PYXIS HelpMate®, the Trackless Robotic Courier, Internet, 3 pgs. No date is available; Mrk.
"Remote Presence", p. 131-147 No date is available; Mrk.
Al-Kassab, "A Review of Telemedicine", Journal of Telemedicine and Telecare, 1999, vol. 5, Supplement 1.
F. Ando et al., "A Multimedia Self-service Terminal with Conferencing Functions", 1995, IEEE, pp. 357-362.
Bar-Cohen et al., 'Virtual reality robotic telesurgery simulations using MEMICA haptic system, Mar. 5, 2001, Internet, pp. 1-7.
Bauer, John et al., "Remote telesurgical mentoring: feasibility and efficacy", 2000, IEEE, pp. 1-9.
Bischoff, "Design Concept and Realization of the Humanoid Service Robot HERMES", Field and Service Robotics, Springer, London, 1998, pp. 485-492.
Blackwell, Gerry, "Video: a Wireless LAN Killer App?", 2002, Internet pp. 1-3.
Brooks, Rodney, Abstracts from Flesh & Machines, How Robots Will Change Us, "Remote Presence", p. 131-147, Feb. 2002.
Cheetham, Anastasia et al., "Interface Development for a Child's Video Conferencing Robot", 2000, pp. 1-4.
Cleary et al., "State of the art in surgical robotics: Clinical applications and technology challenges", Feb. 24, 2002 Internet, pp. 1-26.

CNN, "Floating 'droids' to roam space corridors of the future", Jan. 12, 2000, Internet, pp. 1-4.

Crowley, "Hello to Our Future", AARP Bulletin, Jan. 2000 http://www.cs.cmu.ed/-nursebot/web/press/aarp_99_14/millennium.html.

Dalton, "Techniques for Web Telerobotics", PhD thesis, University of Western Australia, 2001, http://telerobot.mech.uwa.edu.au/information.html, http://catalogue.library.uwa.edu.au/search.

Discovery Channel Canada, "Inventing the Future: 2000 Years of Discovery", Jan. 2, 2000 (Video/Transcript).

Elhajj et al., "Supermedia in Internet-based telerobotic operations", 2001, Internet, pp. 1-14.

Elhajj et al., "Synchronization and Control of Supermedia Transmission Via the Internet", Proceedings of 2001 International Symposium on Intelligent Multimedia, Video and Speech Processing, May 2-4, 2001, Hong Kong.

Fels, "Developing a Video-Mediated Communication System for Hospitalized Children", Telemedicine Journal, vol. 5, No. 2, 1999.

Fetterman, Videoconferencing over the Internet, 2001, Internet, pp. 1-8.

Fiorini, "Health Care Robotics: A Progress Report, IEEE International Conference on Robotics and Automation", 1997.

Ghiasi, "A Generic Web-based Teleoperations Architecture: Details and Experience", SPIE Conference on Telemanipulator and Telepresence Technologies VI, Sep. 1999.

Goldberg et al., "Collaborative Teleoperation via the Internet", IEEE International Conference on Robotics and Automation, Apr. 2000, San Francisco, California.

Goldberg, "Desktop Teloperation via the World Wide Web, Proceedings of the IEEE International Conference on Robotics and Automation", 1995, http://citeseer.ist.psu.edu/cache/papers/cs/5/ftp:zSzzSzusc.eduzSzpubzSziriszSzraiders.pdf/gol.

Goldberg, "More Online Robots, Robots that Manipulate", Internet, Updated Aug. 2001 http://ford.ieor.berkeley.edu/ir/robots_a2.html.

Gump, Michael D., "Robot Technology Improves VA Pharmacies", 2001, Internet, pp. 1-3.

Handley, "RFC 2327 - SDP: Session Description Protocol", Apr. 1998 http://www.faqs.org/rfcs/rfc2327.html.

Hanebeck, "ROMAN: a mobile Robotic Assistant for Indoor Service Applications", Proceedings of the 1997 IEEE/RSJ International Conference on Intelligent Robots and Systems, 1997.

Holmberg, "Development of a Holonomic Mobile Robot for Mobile Manipulation Tasks", International Conference on Field and Service Robotics, Pittsburgh, PA, Aug. 1999.

House Research Organization, Telemedicine in Texas: Public Policy Concerns, May 5, 2000, http://www.hro.house.state.tx.us/focus/telemed.pdf.

Ishiguro, "Integrating a Perceptual Information Infrastructure with Robotic Avatars: A Framework for Tele-Existence" Proceeding of IEEE Conference on Intelligent Robots and Systems, http://www.ai.soc.i.kyoto-u.ac.jp/services/publications/99/99conf/07.pdf.

Ishihara, Ken et al., "Intelligent Microrobot DDS (Drug Delivery System) Measured and Controlled by Ultrasonics", Nov. 3-5, 1991, IEEE/RSJ, pp. 1145-1150, vol. 2.

ITU, "ITU-T H.323 Packet-based multimedia communications", ITU, Feb. 1998, http://www.itu.int/rec/T-REC-H.323-199802-S/en.

Ivanova, Natali, "Master's thesis: Internet Based Interface for Control of a Mobile Robot", Department of Numerical Analysis and Computer Science, no date is availa.

Jenkins, "Telehealth Advancing Nursing Practice", Nursing Outlook, Mar./Apr. 2001, vol. 49, No. 2.

Johanson, Supporting video-mediated communication over the Internet, Chalmers University of Technology, Dept of Computer Engineering, Gothenburg, Sweden, 2003.

Keller et al., "Raven Interface Project", Fall 2001 http://upclose.lrdc.pitt.edu/people/louw_assets/Raven_Slides.pps.

Khatib, "Robots in Human Environments", Proc. International Conference on Control, Automation, Robotics, and Vision, ICRACV2000, Dec. 2000, Singapore, pp. 454-457.

Lane, "Automated Aides", Newsday, Oct. 17, 2000, http://www.cs.cum.edu/-nursebot/web/press/nd4380.htm.

Linebarger, John M. et al., "Concurrency Control Mechanisms for Closely Coupled Collaboration in Multithreaded Virtual Environments", Presence, Special Issue on Advances in Collaborative VEs (2004).

Long, "HelpMate Robotics, Inc. (Formerly Transitions Research Corporation) Robot Navigation Technology", NIST Special Publication 950-1, Mar. 1999, http://www.atp.nist.gov/eao/sp950-1/helpmate.htm.

Luna, Nancy, "Robot a new face on geriatric care", OC Register, Aug. 6, 2003.

Mair, Telepresence—The Technology And Its Economic and Social Implications, IEEE Technology and Society, 1997.

Meng, "E-Service Robot in Home Healthcare", Proceedings of the 2000, IEEE/RSJ, International Conference on Intelligent Robots and Systems, 2000.

Michaud, Introducing 'Nursebot', The Boston Globe, Sep. 11, 2001, pp. 1-5, http://www.cs.cmu.edu/nursebot/web/press/globe_3_01/index.html.

Mobile Robotics Research Group, "Mobile Robotics Research Group", 2000 Internet, pp. 1-2, Edinburgh.

Montemerlo, "Telepresence: Experiments in Next Generation Internet", CMU Robotics Institute, Oct. 20, 1998, http://www.ri.cmu.edu/creative/archives.htm (Video/Transcript).

Murphy, "Introduction to A1 Robotics", 2000.

Nakajima et al., "A Multimedia Teleteaching System sing an Electronic Whiteboard for Two-Way Communication of Motion Videos and Chalkboards", 1993, IEEE, pp. 436-441.

"National Energy Research Scientific Computing Center, Berkeley Lab's RAGE Telepresence Robot Captures R&D100 Award", Jul. 2, 2002, http://www.nersc.gov/news/newsroom/RAGE070202.php.

Nomadic Technologies, Inc., "Nomad XR4000 Hardware Manual", Mar. 1999.

Ogata et al., "Development of Emotional Communication Robot: WAMOEBA-2r—Esperimental evaluation . . . ", 2000 IEEE, pp. 175-180.

Oh, "Autonomous Battery Recharging for Indoor Mobile Robots", Proceedings of Australian Conference on Robotics and Automation, 2000, http://users.rsise.anu.edu.au/rsl/rsl_papers/ACRA2000/Auto_Recharge_Paper.pdf.

Paulos, "PRoP: Personal Roving Presence", ACM:CHI Proceedings of CHI '98, http://www.prop.org/papers/chi98.pdf.

Paulos, Video of PRoP 2 at Richmond Field Station, www.prop.org. May 2001, Printout of Home Page of Website and two-page Transcript of the audio portion of said PRoP Video.

Paulos, et al., "Ubiquitous Tele-embodiment: Applications and Implications", International Journal of Human Computer Studies, Jun. 1997, vol. 46, No. 6, pp. 861-877.

Sandt, Frederic et al., "Perceptions for a Transport Robot in Public Environments", 1997, IROS '97.

Schaeffer, "Care-O-bot: A System for Assisting Elderly or Disabled Persons in Home Environments", Proceedings of AAATE-99, 1999, http://morpha.de/download/publications/IPA_Systems_For_AssistingElderly_or_DisabledPersons_AAATE1999.pdf.

Schultz, "Web Interfaces for Mobile Robots in Public Places", Robotics & Automation magazine, IEEE, vol. 7, Issue 1, Mar. 2000.

Shimoga et al., Touch and force reflection for telepresence surgery, 1994, IEEE, pp. 1049-1050.

Siegwart, "Interacting Mobile Robots on the Web", Proceedings of the 1999 IEEE International Conference on Robotics and Automation, May 1999.

Simmons, "Xavier: An Autonomous Mobile Robot on the Web", IEE robotics and Automation Magazine, 1999, pp. 43-48.

Spawar Systems Center, "Robart", 1998, San Diego, CA, http://web.archive.org/web/*/http://www.nosc.mil/robots/land/robart/robart.html http://web.archive.org/web/19981202205636/http://www.nosc.mil/robots/land/robart/robart.html.

Stephenson, Gary, "Dr. Robot Tested at Hopkins", Aug. 5, 2003, Internet, pp. 1-2.

Stoianovici et al., "Robotic Tools for Minimally Invasive Urologic Surgery", Dec. 2002, Internet, 1-17.

Suplee, "Mastering the Robot", The Washington Post, p. A01, Sep. 17, 2000 http://www.cs.cmu.edu-nursebot/web/press/wash/index.html.

Tendick et al., "Human-Machine Interfaces for Minimally Invasive Surgery", 1997, IEEE, pp. 2771-2776.

Thrun et al, "Probabilistic Algorithms and the Interactive Museum Tour-Guide Robot Minerva", 2000, Internet pp. 1-35.

Tzafestas, et al., "VR-based Teleoperation of a Mobile Robotic Assistant: Progress Report", 2000, Internet, pp. 1-23.

Urquhart, Kim, "InTouch's robotic Companion 'beams up' healthcare experts", Medical Device Daily, vol. 7, No. 39, Feb. 27, 2003, p. 1, 4.

Weiss et al., Telework and video-mediated communication: Importance of real-time interactive communication for workers with disabilities, pp. 1-4, California State University Northridge, http://www.csun.edu/cod/conf/1999/proceedings/session0238.html, no date available.

West et al., "Design of Ball Wheel Mechanisms for Omnidirectional Vehicles with Full Mobility and Invariant Kinematics", Journal of Mechanical Design, vol. 119, pp. 153-161, Jun. 1997.

Yamasaki et al., Applying Personal Robots and Active Interface to Video Conference Systems, 1995, Internet, pp. 243-248.

Yong et al., "Robot task execution with telepresence using virtual reality technology", 1998, Internet, pp. 1-9.

Zipperer, Lorri, "Robotic dispensing system", 1999, Internet, pp. 1-2.

Zorn, Benjamin G., "Ubiquitous Telepresence", http://www.cs.colorado.edu/~zorn/ut/vision/vision.html, Mar. 5, 1996.

* cited by examiner

TELE-ROBOTIC VIDEOCONFERENCING IN A CORPORATE ENVIRONMENT

This application is a continuation-in-part of application Ser. No. 10/783,760, filed on Feb. 20, 2004, which is a continuation-in-part of application Ser. No. 10/206,457, filed on Jul. 25, 2002, now U.S. Pat. No. 6,925,357, and also claims priority to application Ser. No. 60/449,762, filed on Feb. 24, 2003.

BACKGROUND OF THE INVENTION

1. Field of the Invention

The subject matter disclosed generally relates to the field of mobile two-way teleconferencing.

2. Background Information

There have been developed and sold tele-conferencing systems that allow at least two participants to communicate while viewing images of each other. Tele-conferencing systems typically include a camera and a telephone that are stationary during use. Because the equipment is stationary, tele-conferences are typically scheduled events located in a dedicated room.

It is imperative to integrate business entities that have been merged, acquired or somehow combined. The facilities for the business entities may be in separate physical locations. When integrating remote business units, managers and other employees must frequently visit the remote facility to assist in the integration of the units. This requires travel which is an inefficient use of the managers/employees time. It would be desirable to allow the manager/employee to virtually visit the remote facility to assist in unit integration or otherwise visit the facility.

Robots have been used in a variety of applications ranging from remote control of hazardous material to assisting in the performance of surgery. For example, U.S. Pat. No. 5,762,458 issued to Wang et al. discloses a system that allows a surgeon to perform minimally invasive medical procedures through the use of robotically controlled instruments. One of the robotic arms in the Wang system moves an endoscope that has a camera. The camera allows a surgeon to view a surgical area of a patient.

Tele-robots such as hazardous waste handlers and bomb detectors may contain a camera that allows the operator to view the remote site. Canadian Pat. No. 2289697 issued to Treviranus, et al. discloses a teleconferencing platform that has both a camera and a monitor. The platform includes mechanisms to both pivot and raise the camera and monitor. The Treviranus patent also discloses embodiments with a mobile platform, and different mechanisms to move the camera and the monitor.

There has been marketed a mobile robot introduced by InTouch-Health, Inc., the assignee of this application, under the trademarks COMPANION and RP-6. The InTouch robot is controlled by a user at a remote station. The remote station may be a personal computer with a joystick that allows the user to remotely control the movement of the robot. Both the robot and remote station have cameras, monitors, speakers and microphones to allow for two-way video/audio communication.

U.S. Pat. Application Pub. No. US 2001/0054071 filed in the name of Loeb, discloses a video-conferencing system that includes a number of graphical user interfaces ("GUIs") that can be used to establish a video-conference. One of the GUIs has an icon that can be selected to make a call. The Loeb application discloses stationary video-conferencing equipment such as a television. There is no discussion in Loeb about the use of robotics.

BRIEF SUMMARY OF THE INVENTION

A method and system for conducting a business teleconference with a robot that can move across a business facility. Images and sound are transmitted between the robot and a remote station.

DETAILED DESCRIPTION

Disclosed is a business to business mobile teleconferencing system. The system includes a mobile robot that can be remotely operated from a remote station. Both the robot and the remote station may have a camera, a screen, a microphone and a speaker to conduct a teleconference between a user at the remote station and personnel located in viewing proximity of the robot.

By way of example, a manager at the remote station may move the robot along a hall and/or into the offices of another facility and conduct tele-conferences with personnel at the facility. The tele-conferencing capability of the robot creates a remote presence of the manager at the facility. The manager may conduct scheduled or unscheduled meetings with the remote personnel. Additionally, the manager may give a presentation to a group located at the facility. The mobile nature of the teleconferencing robot may allow for a more lively presentation and demonstration.

The system may be used to assist in the integration of two business entities. For example, two remote business entities may be consolidated through a merger or acquisition. Someone at the first entity may virtually visit personnel at the other entity by moving the robot and conducting teleconferences with personnel in viewing distance of the robot. This would allow someone at the remote site to move about the facility and interact with personnel without having to travel to the facility.

Figure 1:
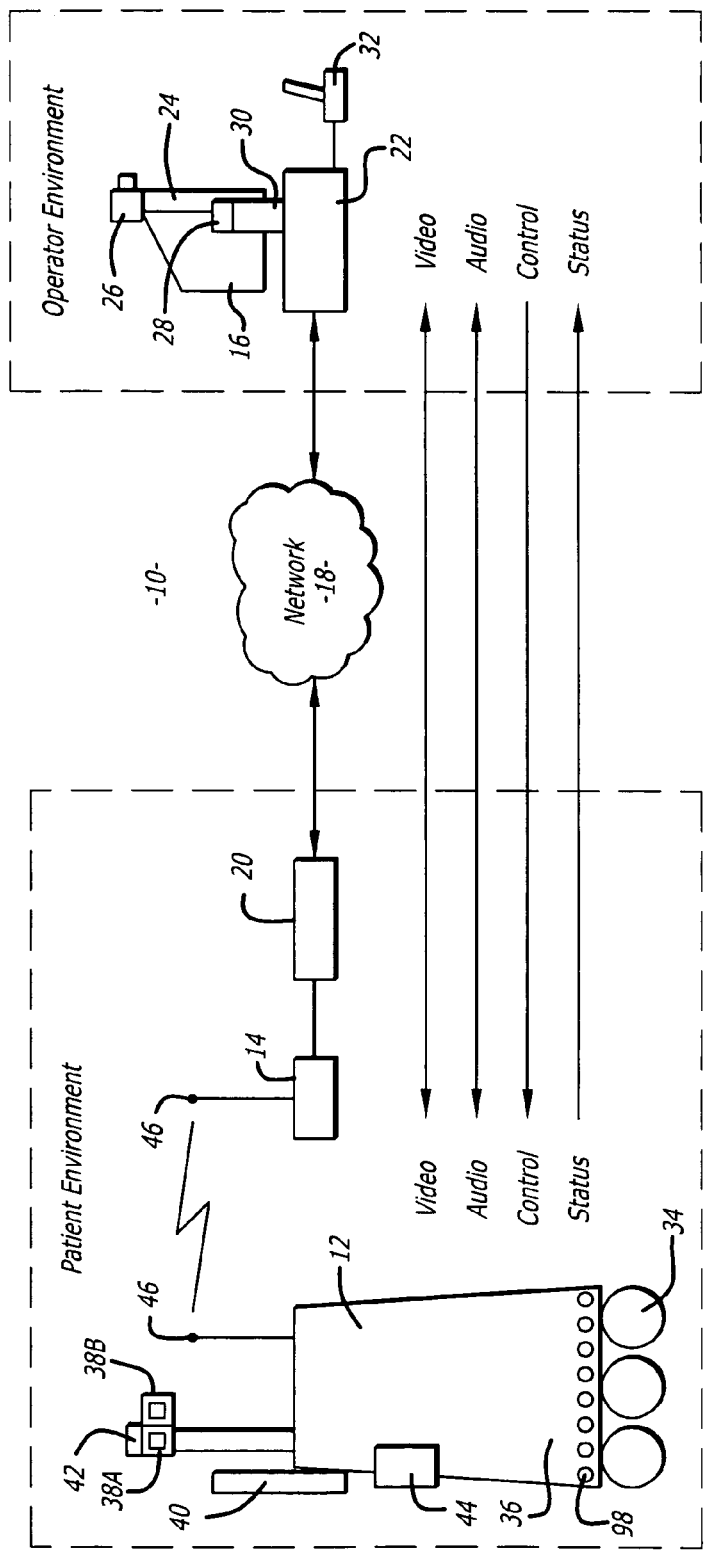
FIG. 1 is an illustration of a robotic system.

Referring to the drawings more particularly by reference numbers, FIG. 1 shows a robotic system 10 that can be used to conduct a remote visit. The robotic system 10 includes a robot 12, a base station 14 and a remote control station 16. The remote control station 16 may be coupled to the base station 14 through a network 18. By way of example, the network 18 may be either a packet switched network such as the Internet, or a circuit switched network such has a Public Switched Telephone Network (PSTN) or other broadband system. The base station 14 may be coupled to the network 18 by a modem 20 or other broadband network interface device. By way of example, the base station 14 may be a wireless router. Alternatively, the robot 12 may have a direct connection to the network thru for example a satellite.

The remote control station 16 may include a computer 22 that has a monitor 24, a camera 26, a microphone 28 and a speaker 30. The computer 22 may also contain an input device 32 such as a joystick or a mouse. The control station 16 is typically located in a place that is remote from the robot 12. Although only one remote control station 16 is shown, the system 10 may include a plurality of remote stations. In general any number of robots 12 may be controlled by any number of remote stations 16 or other robots 12. For example, one remote station 16 may be coupled to a plurality of robots 12, or one robot 12 may be coupled to a plurality of remote stations 16, or a plurality of robots 12.

Each robot 12 includes a movement platform 34 that is attached to a robot housing 36. Also attached to the robot housing 36 are a pair of cameras 38A and 38B, a monitor 40, a microphone(s) 42 and a speaker(s) 44. The microphone 42 and speaker 30 may create a stereophonic sound. The robot 12 may also have an antenna 46 that is wirelessly coupled to an antenna 48 of the base station 14. The system 10 allows a user at the remote control station 16 to move the robot 12 through operation of the input device 32. The robot camera 38 is coupled to the remote monitor 24 so that a user at the remote station 16 can view a patient. Likewise, the robot monitor 40 is coupled to the remote camera 26 so that the patient can view the user. The microphones 28 and 42, and speakers 30 and 44, allow for audible communication between the patient and the user.

The cameras 38A and 38B may provide two different fields of view. For example, camera 38A may provide a wide angle view that is advantageous for driving the robot and viewing large groups, while camera 38B provides a narrow view that can be utilized for one on one teleconferences. Although two cameras are shown and described, it is to be understood that one camera with one or more lens assemblies may be used to create the wide angle and narrow angle fields of view.

The remote station computer 22 may operate Microsoft OS software and WINDOWS XP or other operating systems such as LINUX. The remote computer 22 may also operate a video driver, a camera driver, an audio driver and a joystick driver. The video images may be transmitted and received with compression software such as MPEG CODEC.

Figure 2:
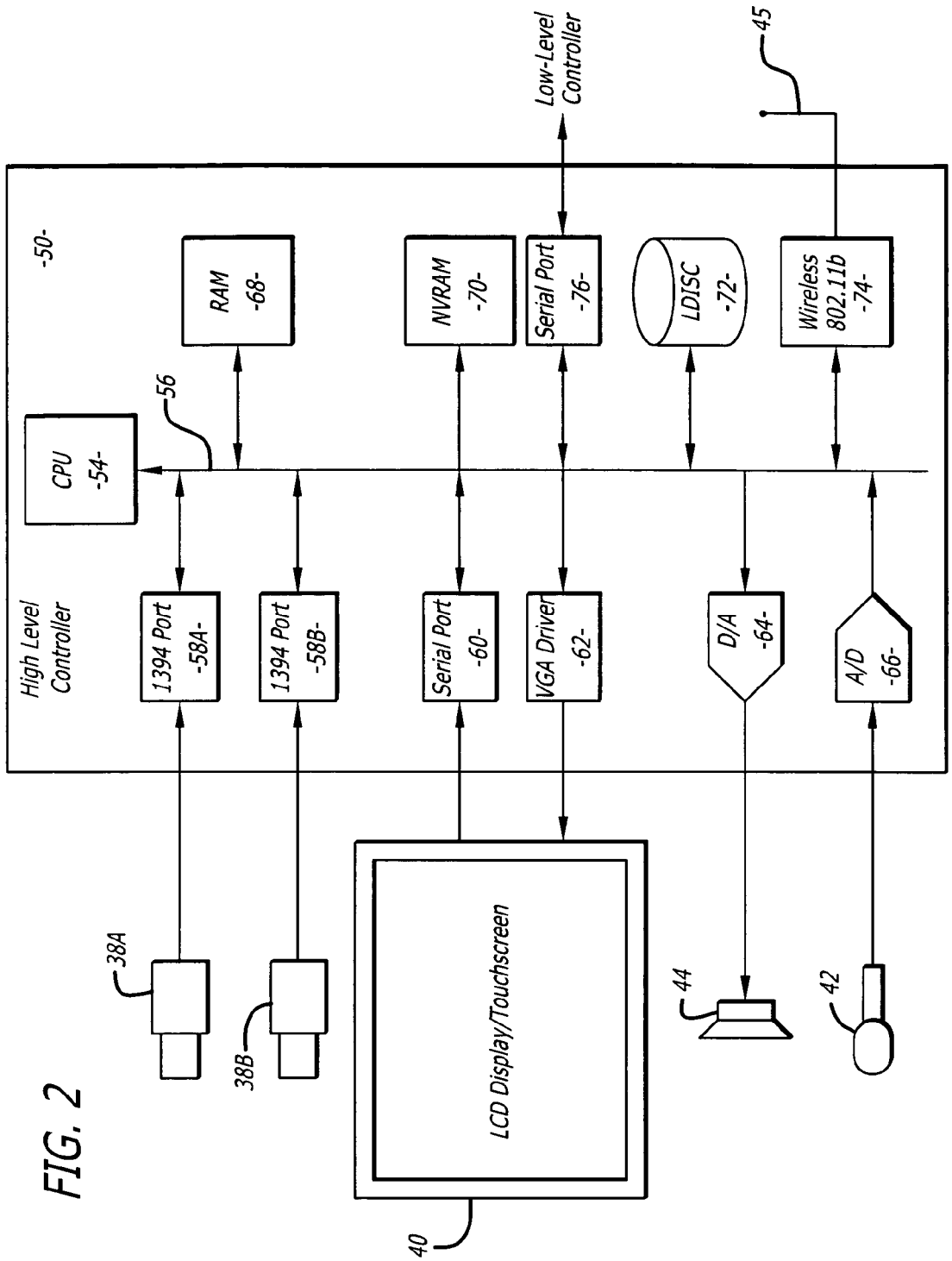
FIG. 2 is a schematic of an electrical system of a robot.
Figure 3:
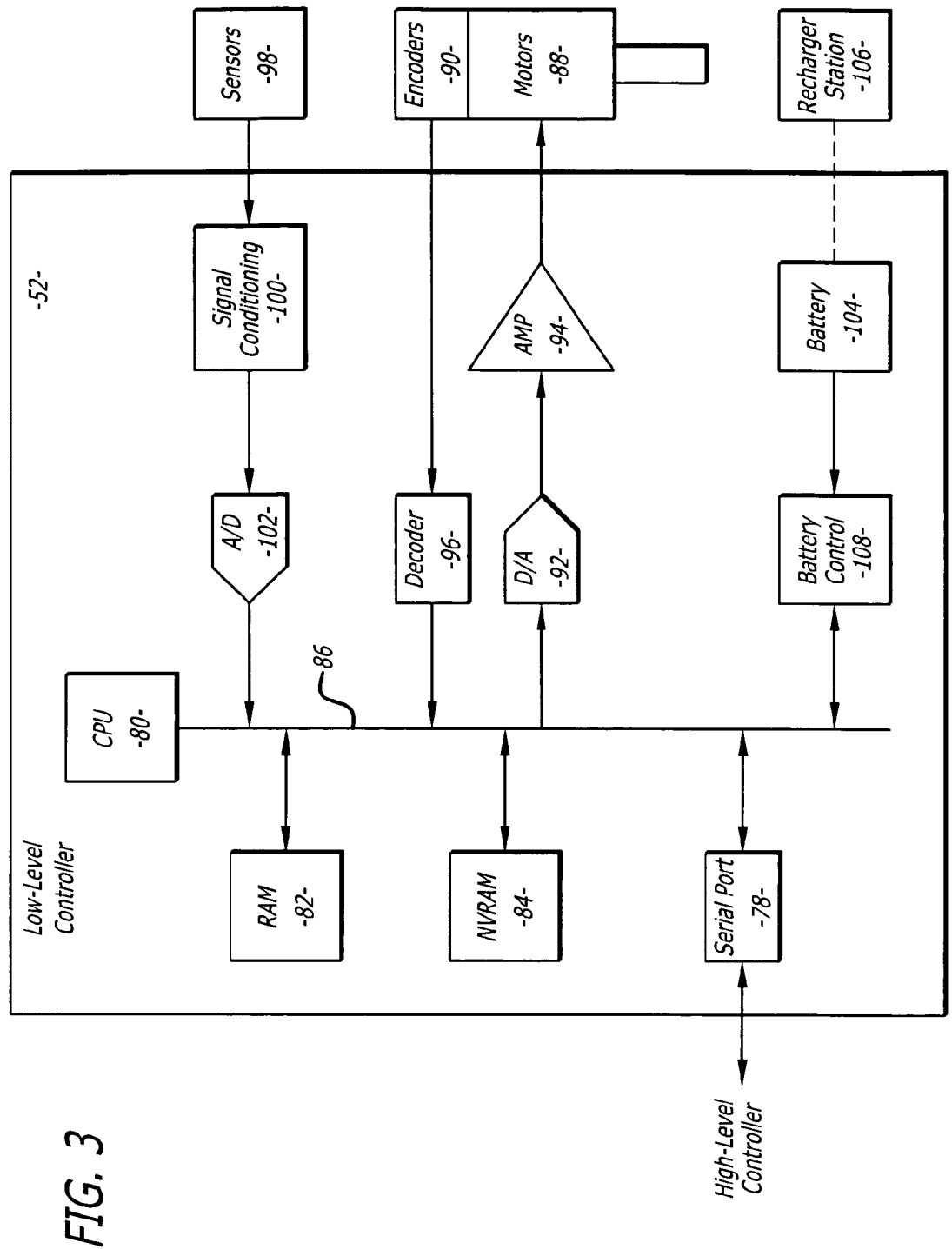
FIG. 3 is a further schematic of the electrical system of the robot.

FIGS. 2 and 3 show an embodiment of a robot 12. Each robot 12 may include a high level control system 50 and a low level control system 52. The high level control system 50 may include a processor 54 that is connected to a bus 56. The bus 56 is coupled to the cameras 38A and 38B by input/output (I/O) ports 58A and 58B, respectively. The monitor 40 is coupled to the bus 56 by a serial output port 60 and a VGA driver 62. The monitor 40 may include a touchscreen function that allows the patient to enter input by touching the monitor screen.

The speaker 44 is coupled to the bus 56 by a digital to analog converter 64. The microphone 42 is coupled to the bus 56 by an analog to digital converter 66. The high level controller 50 may also contain random access memory (RAM) device 68, a non-volatile RAM device 70 and a mass storage device 72 that are all coupled to the bus 62. The mass storage device 72 may contain medical files of the patient that can be accessed by the user at the remote control station 16. For example, the mass storage device 72 may contain a picture of the patient. The user, particularly a health care provider, can recall the old picture and make a side by side comparison on the monitor 24 with a present video image of the patient provided by the camera 38. The robot antennae 45 may be coupled to a wireless transceiver 74. By way of example, the transceiver 74 may transmit and receive information in accordance with IEEE 802.11b.

The controller 54 may operate with a LINUX OS operating system. The controller 54 may also operate MS WINDOWS along with video, camera and audio drivers for communication with the remote control station 16. Video information may be transceived using MPEG CODEC compression techniques. The software may allow the user to send e-mail to the patient and vice versa, or allow the patient to access the Internet. In general the high level controller 50 operates to control communication between the robot 12 and the remote control station 16.

The high level controller 50 may be linked to the low level controller 52 by serial ports 76 and 78. The low level controller 52 includes a processor 80 that is coupled to a RAM device 82 and non-volatile RAM device 84 by a bus 86. Each robot 12 contains a plurality of motors 88 and motor encoders 90. The motors 88 can actuate the movement platform and move other parts of the robot such as the monitor and camera. The encoders 90 provide feedback information regarding the output of the motors 88. The motors 88 can be coupled to the bus 86 by a digital to analog converter 92 and a driver amplifier 94. The encoders 90 can be coupled to the bus 86 by a decoder 96. Each robot 12 also has a number of proximity sensors 98 (see also FIG. 1). The position sensors 98 can be coupled to the bus 86 by a signal conditioning circuit 100 and an analog to digital converter 102.

The low level controller 52 runs software routines that mechanically actuate the robot 12. For example, the low level controller 52 provides instructions to actuate the movement platform to move the robot 12. The low level controller 52 may receive movement instructions from the high level controller 50. The movement instructions may be received as movement commands from the remote control station or another robot. Although two controllers are shown, it is to be understood that each robot 12 may have one controller, or more than two controllers, controlling the high and low level functions.

The various electrical devices of each robot 12 may be powered by a battery(ies) 104. The battery 104 may be recharged by a battery recharger station 106 (see also FIG. 1). The low level controller 52 may include a battery control circuit 108 that senses the power level of the battery 104. The low level controller 52 can sense when the power falls below a threshold and then send a message to the high level controller 50.

The system may be the same or similar to a robotic system provided by the assignee InTouch Technologies, Inc. of Santa Barbara, Calif. under the name RP-6, which is hereby incorporated by reference. The system may also be the same or similar to the system disclosed in application Ser. No. 10/206, 457 published on Jan. 29, 2004, now U.S. Pat. No. 6,925,357, which is hereby incorporated by reference.

Figure 4:
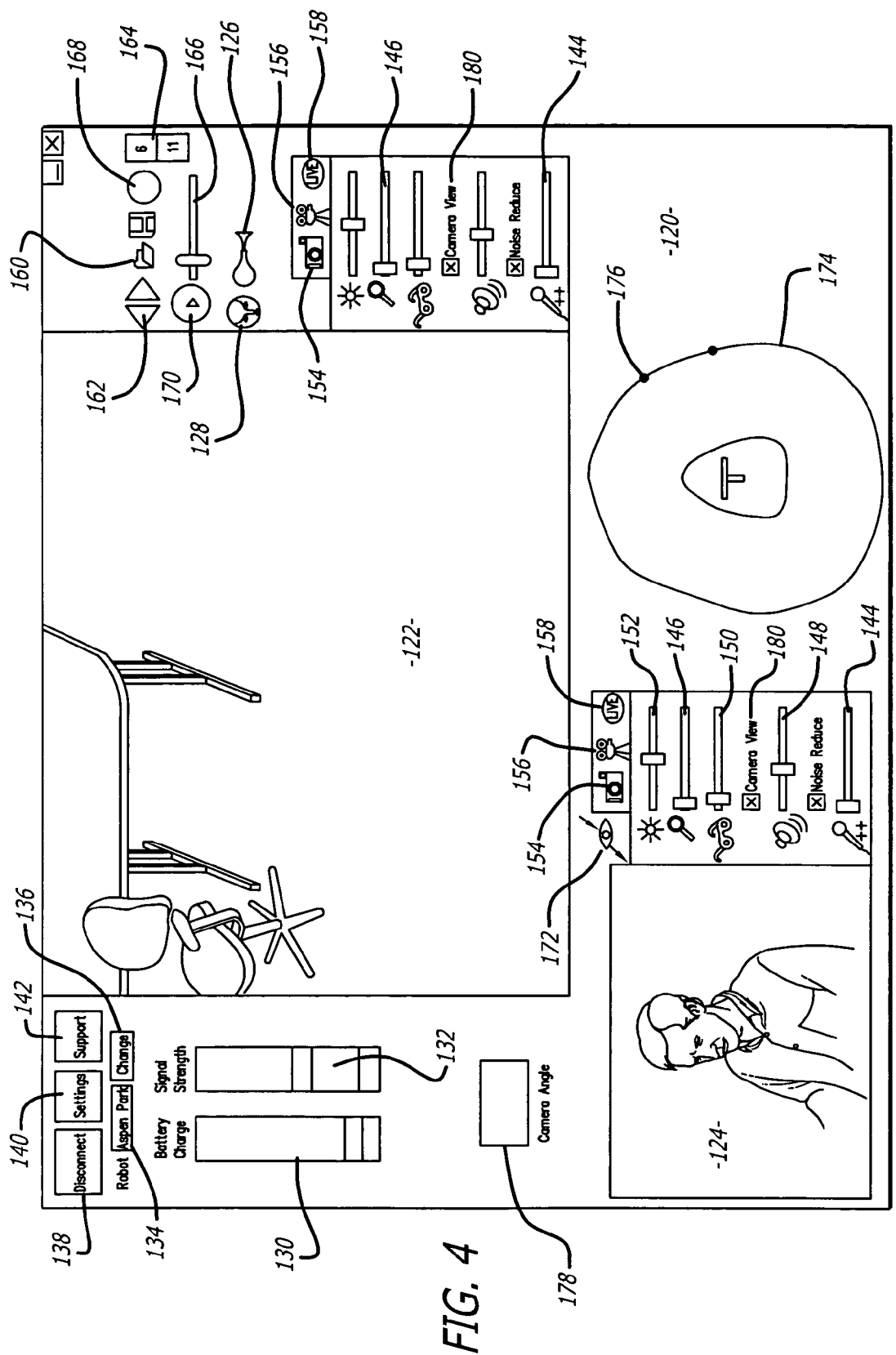
FIG. 4 is a graphical user interface of a remote station.

FIG. 4 shows a display user interface ("DUI") 120 that can be displayed at the remote station 16. The DUI 120 may include a robot view field 122 that displays a video image provided by the camera of the robot. The DUI 120 may also include a station view field 124 that displays a video image provided by the camera of the remote station 16. The DUI 120 may be part of an application program stored and operated by the computer 22 of the remote station 16.

The DUI 120 may include alert input icons 126 and 128. Alert icon 126 can be selected by the user at the remote station to generate an alert indicator such as a sound from the speaker of the robot. Selection of the icon generates an alert input to the robot. The robot generates a sound through its speaker in response to the alert input. By way of example, the sound may simulate the noise of a horn. Consequently, the icon may have the appearance of a horn. The remote station user may select the horn shaped icon 126 while remotely moving the robot to alert persons to the presence of the moving robot.

Alert icon 128 can be selected to request access to the video images from the robot. The default state of the robot may be to not send video information to the remote station. Selecting the alert icon 128 sends an alert input such as an access request to the robot. The robot then generates an alert indicator. The alert indicator can be a sound generated by the robot speaker, and/or a visual prompt on the robot monitor. By way of example, the visual prompt may be a "flashing" graphical icon. The sound may simulate the knocking of a door. Consequently, the alert icon 128 may have the appearance of a door knocker.

In response to the alert indicator the user may provide a user input such as the depression of a button on the robot, or the selection of a graphical image on the robot monitor, to allow access to the robot camera. The robot may also have a voice recognition system that allows the user to grant access with a voice command. The user input causes the robot to begin transmitting video images from the robot camera to the remote station that requested access to the robot. A voice communication may be established before the cycle of the alert input and response, to allow the user at the remote station to talk to the caller recipient at the robot.

The DUI 120 may include a graphical "battery meter" 130 that indicates the amount of energy left in the robot battery. A graphical "signal strength meter" 132 may indicate the strength of the wireless signal transmitted between the robot and the base station (see FIG. 1).

The DUI 120 may include a location display 134 that provides the location of the robot. The CHANGE button 136 can be selected to change the default robot in a new session. The user can initiate and terminate a session by selecting box 138. The box 138 changes from CONNECT to DISCONNECT when the user selects the box to initiate a session. System settings and support can be selected through buttons 140 and 142.

Both the robot view field 122 and the station view field 124 may have associated graphics to vary the video and audio displays. Each field may have an associated graphical audio slide bar 144 to vary the audio level of the microphone and another slide bar 146 to vary the volume of the speakers.

The DUI 120 may have slide bars 148, 150 and 152 to vary the zoom, focus and brightness of the cameras, respectively. A still picture may be taken at either the robot or remote station by selecting one of the graphical camera icons 154. The still picture may be the image presented at the corresponding field 122 or 124 at the time the camera icon 154 is selected. Capturing and playing back video can be taken through graphical icons 156. A return to real time video can be resumed, after the taking of a still picture, captured video, or reviewing a slide show, by selecting a graphical LIVE button 158.

A still picture can be loaded from disk for viewing through selection of icon 160. Stored still images can be reviewed by selecting buttons 162. The number of the image displayed relative to the total number of images is shown by graphical boxes 164. The user can rapidly move through the still images in a slide show fashion or move through a captured video clip by moving the slide bar 166. A captured video image can be paused through the selection of circle 168. Play can be resumed through button 170. Video or still images may be transferred to the robot by selecting icon 172.

A graphical depiction of the base of the robot can be shown in sensor field 174. The sensor may have various sensors that sense contact with another object. The sensor field 174 can provide a visual display of the sensors that detect the object. By way of example, the field may have one or more graphical dots 176 that display where on the robot the sensors detected an object. This provides the user with a sense of the robot environment that is outside the view of the robot camera.

The DUI 120 may have a view angle icon 178 that allows the user to toggle between the wide view angle of camera 38A and the narrow view angle of camera 38B. Although one icon is shown, it is to be understood that there may be two separate icons, one for the wide view angle and the other for the narrow view angle, that can each be separately selected by the user. Although toggling between cameras is shown and described, it is to be understood that the images from both cameras may be simultaneously displayed in the same or different fields of the display user interface. Toggling between cameras may also be accomplished through other inputs such as keystroke, mouse, joystick button, or automatically with the slide bar 146. The DUI 120 may also have graphical icons 180 that can be selected to turn the robot and remote station cameras on and off.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for conducting a business tele-conference, comprising:
    moving a robot that has a screen, a camera, a speaker and a microphone, across a surface of a business facility with at least one signal from a first remote station that has a screen, a camera, a speaker and a microphone;
    transmitting images and sound between the first robot and the first remote station and displaying the image captured by the remote station camera on the robot screen;
    moving the robot across the surface of the business facility with at least one signal from a second remote station that has a screen, a camera, a speaker and a microphone;
    transmitting images and sound between the robot and the second remote station; and,
    arbitrating to control access to the robot by either the first remote station or the second remote station.

2. The method of claim 1, wherein a user at the first remote station gives a presentation through the robot to an audience within viewing distance of the robot.

3. The method of claim 1, wherein a user at the remote station moves the robot into at least one office to conduct a teleconference with one or more occupants of the office.

4. The method of claim 3, wherein the user is a manager and the office occupants are employees.

5. The method of claim 1, wherein the user at the first remote station attends a meeting through the robot.

6. The method of claim 5, wherein the meeting is unscheduled.

7. The method of claim 1, wherein the tele-conference occurs after the joining of a business entity at the first remote station and a business entity at the robot.

8. A method for assisting in the integration of a first business entity with a second business entity, comprising:
    moving a robot that has a screen, a camera, a speaker and a microphone, across a surface of a business facility of the first business entity with at least one signal from a first remote station that has a screen, a camera, a speaker and a microphone and is located at the second business entity;
    moving the robot across the surface of the business facility with at least one signal from a second remote station that has a screen, a camera, a speaker and a microphone;
    transmitting images and sound between the robot and the first remote station and displaying the image captured by the remote station camera on the robot screen;
    transmitting images and sound between the robot and the second remote station; and,
    arbitrating to control access to the robot by either the first remote station or the second remote station.

9. The method of claim 8, wherein a user at the first remote station gives a presentation through the robot to an audience within viewing distance of the robot.

10. The method of claim 8, wherein a user at the first remote station moves the robot into a plurality of offices to conduct a teleconference with one or more occupants of each office.

11. The method of claim 10, wherein the user is a manager and the office occupants are employees.

12. The method of claim 8, wherein the user at the first remote station attends a meeting through the robot.

13. The method of claim 12, wherein the meeting is unscheduled.

14. The method of claim 8, wherein the tele-conference occurs after the joining of a business entity at the remote station and a business entity at the robot.

* * * * *